United States Patent
Downs

(10) Patent No.: US 8,781,650 B2
(45) Date of Patent: Jul. 15, 2014

(54) AIRCRAFT NAVIGATION SYSTEM

(75) Inventor: Joshua Lee Downs, Auburn, WA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 13/445,136

(22) Filed: Apr. 12, 2012

(65) Prior Publication Data
US 2013/0270394 A1 Oct. 17, 2013

(51) Int. Cl.
G01C 23/00 (2006.01)
G06F 19/00 (2011.01)

(52) U.S. Cl.
USPC ............... 701/3; 701/117; 701/120; 701/23; 701/26

(58) Field of Classification Search
USPC ......... 701/117, 120, 23, 26, 3, 300, 301, 410, 701/411, 414, 416
See application file for complete search history.

(56) References Cited

U.S. PATENT DOCUMENTS

| | | | |
|---|---|---|---|
| 7,737,878 B2 * | 6/2010 | van Tooren et al. | 342/29 |
| 8,082,102 B2 | 12/2011 | Ravenscroft | |
| 8,290,696 B1 * | 10/2012 | Sridhar et al. | 701/120 |
| 8,504,281 B2 * | 8/2013 | Brennan | 701/120 |
| 2006/0217877 A1 * | 9/2006 | Bodin et al. | 701/206 |
| 2009/0027253 A1 * | 1/2009 | van Tooren et al. | 342/29 |
| 2010/0131121 A1 | 5/2010 | Gerlock | |
| 2010/0153875 A1 * | 6/2010 | O'Flynn et al. | 715/786 |
| 2010/0211302 A1 * | 8/2010 | Ribbe et al. | 701/120 |

FOREIGN PATENT DOCUMENTS

| | | |
|---|---|---|
| EP | 2244150 A2 | 10/2010 |
| EP | 2410295 A2 | 1/2012 |
| WO | WO2011132002 A2 | 10/2011 |

OTHER PUBLICATIONS

UK search report dated Oct. 8, 2013 regarding application GB1306044.7, reference NAMM/BOE/P126374GB00, applicant The Boeing Company, 9 pages.

* cited by examiner

Primary Examiner — Ian Jen
(74) Attorney, Agent, or Firm — Yee & Associates, P.C.

(57) ABSTRACT

A method and apparatus for assisting in management of unmanned aerial vehicles. Planned routes are identified for the unmanned aerial vehicles. The planned routes are displayed on a map. A set of planned routes is identified that is within a predefined distance of a selected planned route during substantially a same point in time within a viewing area on the map.

20 Claims, 10 Drawing Sheets

AIRCRAFT NAVIGATION SYSTEM

BACKGROUND INFORMATION

1. Field

The present disclosure relates generally to aircraft and, in particular, to displaying information used to control the movement of aircraft. Still more particularly, the present disclosure relates to a method and apparatus for displaying information for controlling the movement of unmanned aerial vehicles.

2. Background

Many aircraft have navigation displays for displaying information used to operate an aircraft. These navigation displays may display maps to an operator of the aircraft for use in operating the aircraft. These maps may include information, such as terrain, weather, navigation aids, wind, routes, direction of travel, route of travel, and other types of information. These types of displays are typically in the form of a map displayed in a top-down view. An icon representing the aircraft is typically displayed on a map in a location representing the current location of the aircraft.

In some cases, an operator may manage more than one aircraft. For example, an operator may manage multiple unmanned aerial vehicles. The routes planned for these unmanned aerial vehicles may be displayed in a top-down view. With this view, the different planned routes for the unmanned aerial vehicles may overlap each other in the display on the top-down view. Planned routes for even a single unmanned aerial vehicle may overlap.

The display of the planned routes may show an overlap in multiple locations on the display. Although the planned routes may overlap in the display of the planned routes, the overlap does not necessarily mean that the unmanned aerial vehicles having planned routes that overlap will reach a location at the same time. Further, although unmanned aerial vehicles may reach the same location where an overlap occurs at the same time, the altitude difference between the unmanned aerial vehicles may be large enough that the overlap is not a concern for operating the unmanned aerial vehicles.

Locations where the overlap occurs are considered to be cluttered when the unmanned aerial vehicles with routes that overlap in these locations do not reach the locations at the same time, the unmanned aerial vehicles reach the locations at the same time but the altitude differences provide a desired level of separation between the unmanned aerial vehicles, or some combination thereof.

Further, as the number of unmanned aerial vehicles increases and the complexity of the planned routes increases the number of locations in which an overlap occurs, the display of the planned routes may become difficult to use. As a result, the display of the planned routes may not be as useful as desired for an operator managing the unmanned aerial vehicles. Therefore, it would be desirable to have a method and apparatus that takes into account at least some of the issues discussed above as well as other possible issues.

SUMMARY

In one illustrative embodiment, a method for assisting in management of unmanned aerial vehicles is provided. Planned routes are identified for the unmanned aerial vehicles. The planned routes are displayed on a map. A set of planned routes is identified that is within a predefined distance of a selected planned route during substantially a same point in time within a viewing area on the map.

In another illustrative embodiment, an apparatus comprises a navigation system. The navigation system is configured to identify planned routes for unmanned aerial vehicles, display the planned routes on a map, and identify a set of planned routes that is within a predefined distance of a selected planned route during substantially a same point in time within a viewing area on the map.

In yet another illustrative embodiment, a method for assisting in management of vehicles is provided. Planned routes are identified for the vehicles. The planned routes are displayed on a map. A set of planned routes is identified that is within a predefined distance of a selected planned route during substantially a same point in time within a viewing area on the map.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that displays of routes may be simplified by reducing other information on a display containing a top-down view. For example, terrain, symbols, and other information may be filtered to reduce the amount of information on the display. The illustrative embodiments also recognize and take into account that the use of color schemes and line styles for different aircraft also may be used to increase the emphasis of routes.

The illustrative embodiments recognize and take into account that filtering a display of routes to emphasize the routes may allow the operator to focus more on the routes, but may remove other information that is desirable for operating the unmanned aerial vehicles. Further, other solutions such as using color schemes and line styles may not follow rules or regulations that may be in place for displaying routes for aircraft.

Figure 1:
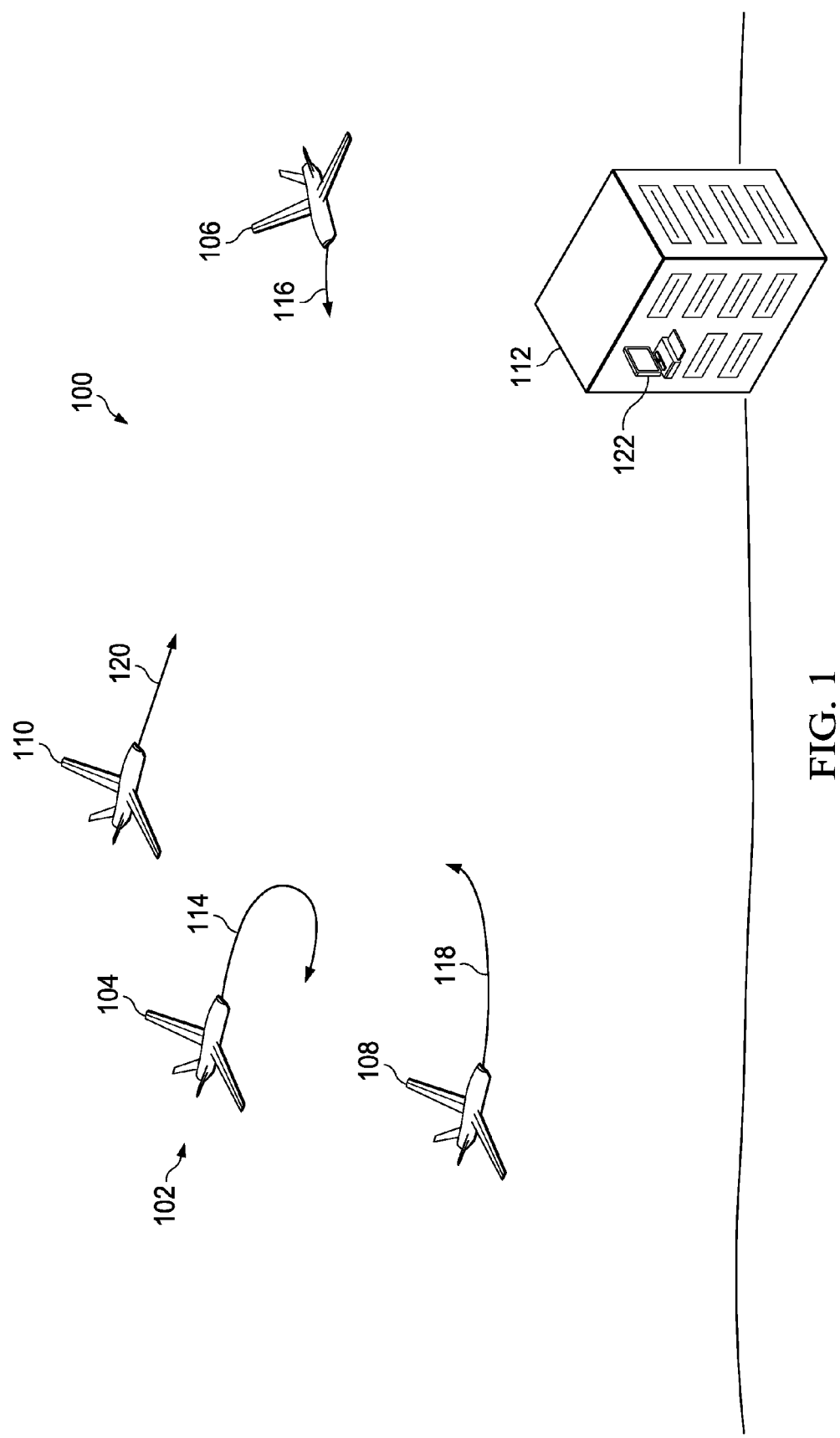
FIG. 1 is an illustration of an aircraft environment in accordance with an illustrative embodiment.

With reference now to the figures and, in particular, with reference to FIG. 1, an illustration of an aircraft environment is depicted in accordance with an illustrative embodiment. In this illustrative example, aircraft environment 100 includes aircraft in the form of unmanned aerial vehicles 102. As depicted, unmanned aerial vehicles 102 include unmanned aerial vehicle 104, unmanned aerial vehicle 106, unmanned aerial vehicle 108 and unmanned aerial vehicle 110.

In these illustrative examples, unmanned aerial vehicles 102 are managed by an operator at ground station 112. Unmanned aerial vehicles 102 may have planned routes. For example, unmanned aerial vehicle 104 may fly on planned route 114, unmanned aerial vehicle 106 may fly on planned route 116, unmanned aerial vehicle 108 may fly on planned route 118, and unmanned aerial vehicle 110 may fly on planned route 120.

In managing unmanned aerial vehicles 102, the operator may need to visualize these routes. For example, unmanned aerial vehicle 104 may fly closer than desired to unmanned aerial vehicle 108 while unmanned aerial vehicles 102 fly on the planned routes. The operator may employ navigation system 122 to view flight information about the planned routes for unmanned aerial vehicles 102.

If the operator feels that unmanned aerial vehicle 104 may fly closer than desired to unmanned aerial vehicle 108, the operator at ground station 112 may make adjustments to the planned routes of either unmanned aerial vehicle 104 or unmanned aerial vehicle 108 when the operator is aware of such a situation. In these illustrative examples, an illustrative embodiment may be implemented at ground station 112 to assist the operator in managing operation of unmanned aerial vehicles 102.

In one illustrative embodiment, navigation system 122 provides a method for assisting the management of unmanned aerial vehicles 102. For example, navigation system 122 may be configured to display the routes for unmanned aerial vehicles 102. Navigation system 122 provides an ability to reduce the clutter and confusion that may occur from overlap between the planned routes for unmanned aerial vehicles 102.

Planned routes for unmanned aerial vehicles 102 are identified. These planned routes may include the original planned routes as well as any changes that may be made based on instructions, weather, and other conditions. Any changes that occur to a planned route become a new planned route for the aircraft. In other words, a planned route may reflect changes that occur during flight.

For example, an operator of an aircraft may receive a flight plan as a planned route. As the operator flies the aircraft along the planned route indicated by the flight plan, instructions or weather conditions may require the operator to change course. Once the aircraft changes course in response to a particular condition or instruction, the new flight path is the new planned route.

Further, if an aircraft is flying "off-route" of within a certain deviation from the route indicated by the flight plan, the aircraft is flying along a new planned route. In other words, a planned route is any route projected or anticipated by the flight parameters of the aircraft. Planned routes may change in substantially real time as the aircraft changes the projected route. In another illustrative example, an operator may fly off-route or within a deviation of the flight plan while awaiting additional clearance or other instructions from air traffic control.

The planned routes are displayed on a map in navigation system 122. A set of planned routes that is within a predefined distance of a selected planned route during a same point in time within a viewing area on the map is identified. As used herein, a "set" when used with reference to items means zero, one, or more items. For example, a set of planned routes is zero or more planned routes. In other words, the set of planned routes may be an empty set.

The set of planned routes and the selected planned route are displayed in the viewing area. Other routes not within the set of routes are not displayed. As a result, the operator may only see routes that may overlap each other in an undesired manner at the same time.

In this manner, the operator at ground station 112 may be provided with greater situation awareness for managing unmanned aerial vehicles 102.

Figure 2:
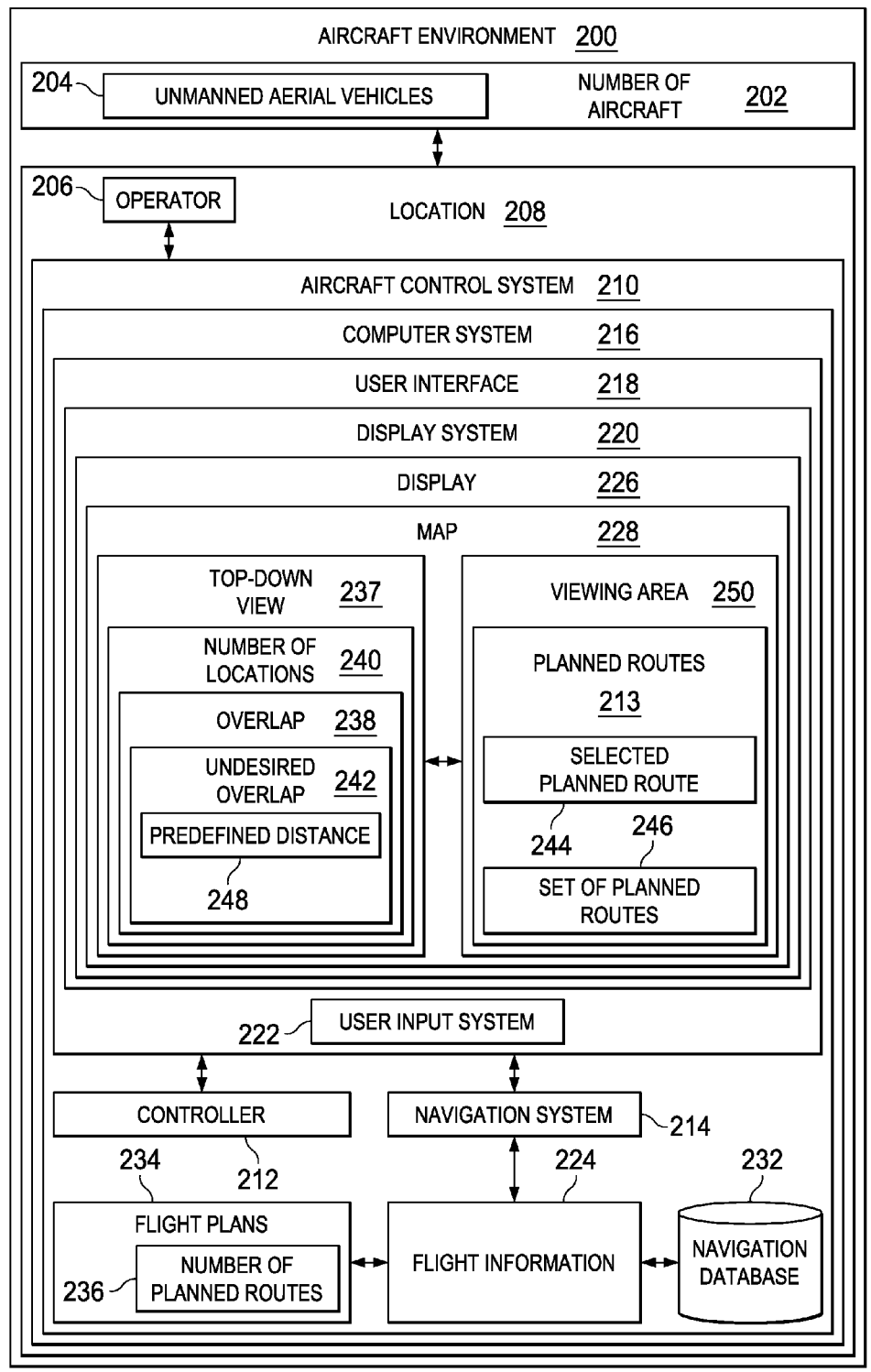
FIG. 2 is an illustration of a block diagram of an aircraft environment in accordance with an illustrative embodiment.

With reference now to FIG. 2, an illustration of a block diagram of an aircraft environment is depicted in accordance with an illustrative embodiment. In this illustrative example, aircraft environment 100 in FIG. 1 is an example of one implementation for aircraft environment 200 shown in block form in this figure.

Aircraft environment 200 includes number of aircraft 202. As used herein, a "number of" when used with reference to items means one or more items. For example, number of aircraft 202 is one or more aircraft. In this illustrative example, number of aircraft 202 takes the form of unmanned aerial vehicles 204.

Operator 206 at location 208 manages the operation of unmanned aerial vehicles 204 from location 208. Location 208 may be, for example, without limitation, a ground location, an aircraft, a ship, or some other suitable location.

As depicted, operator 206 manages the operation of number of aircraft 202 using aircraft control system 210. In these illustrative examples, aircraft control system 210 includes controller 212 and navigation system 214.

As depicted, controller 212 is configured to control operation of unmanned aerial vehicles 204. For example, operator 206 may perform operations such as updating one or more of planned routes 213, initiating surveillance operations, dropping payloads, and other suitable operations. Operator 206 obtains information to manage unmanned aerial vehicles 204 through navigation system 214.

In these illustrative examples, controller 212 and navigation system 214 in aircraft control system 210 may be implemented in computer system 216. Computer system 216 may be a number of computers. When more than one computer is present, those computers may be in communications with each other through a communications medium such as a network.

Controller 212 and navigation system 214 may be implemented in software, hardware, or a combination of the two. When software is used, the operations performed by the components may be implemented in the program code configured to be run on a processor unit. When hardware is employed, the hardware may include circuits that operate to perform the operations in the components.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, integrated circuits may be formed on organic semiconductors.

In this illustrative example, operator 206 may interact with controller 212 and navigation system 214 through user interface 218. User interface 218 is hardware and may also include software. User interface 218 includes display system 220 and user input system 222 in this depicted example. Display system 220 is one or more display devices. These display devices may include, for example, without limitation, at least one of a liquid crystal display, a plasma display, and other suitable types of displays.

User input system 222 is one or more user input devices. These user input devices may be, for example, without limitation, at least one of a touch screen, a physical button, a keyboard, a mouse, and other suitable types of input devices.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As depicted, navigation system 214 may provide flight information 224 for unmanned aerial vehicles 204 to operator 206. This flight information may be displayed in display 226 in display system 220. Flight information 224 is configured to be displayed in display 226 in a manner that provides operator 206 with a desired level of situation awareness with respect to the movement of unmanned aerial vehicles 204.

In these illustrative examples, display 226 is generated by navigation system 214. Display 226 may include map 228 and planned routes 213 in these illustrative examples.

Navigation system 214 uses navigation database 232 to identify data for map 228. Map 228 is a map of the area over which unmanned aerial vehicles 204 may fly while operating. In these illustrative examples, map 228 may be, for example, an aeronautical chart containing information needed for operator 206 to manage unmanned aerial vehicles 204. Map 228 may be a moving map in some illustrative examples. For example, the portions of the ground in map 228 may change as unmanned aerial vehicles 204 fly while operating.

Planned routes 213 are the paths or trajectories planned for unmanned aerial vehicles 204. In these illustrative examples, a planned route in planned routes 213 may be defined using waypoints. These waypoints have locations that may be defined using coordinates such as latitude and longitude. Further, the waypoints also may include an altitude. A planned route may be as simple as a shortest distance trajectory that intercepts and follows published airways and approach procedures between the origin and separate destination, or may have complex turns, altitude changes, and other maneuvers. For example, a planned route for a single unmanned aerial vehicle may have complex turns and maneuvers such that one portion of the planned route crosses another portion of the planned route. These complex turns, altitude changes, and/or other maneuvers may be more confusing than desired.

In these illustrative examples, planned routes 213 may be initially identified from flight plans 234. Planned routes 213 may change during operation of unmanned aerial vehicles 204 in some instances. For example, operator 206 may receive instructions from an aircraft traffic control system operator requiring updates to one or more of planned routes 213. In another illustrative example, undesired weather or other operating conditions may result in updates being made to one or more of planned routes 213.

In generating display 226, navigation system 214 may use navigation database 232 and flight plans 234 for unmanned aerial vehicles 204. Flight plans 234 may include number of planned routes 236 for unmanned aerial vehicles 204.

In these illustrative examples, map 228 and planned routes 213 are displayed in display 226 in top-down view 237. As displayed in display 226 on display system 220, overlap 238 may be present in planned routes 213. Overlap 238 is number of locations 240 where two or more of planned routes 213 intersect or overlap each other. In some cases, number of locations 240 may be great enough that overlap 238 is undesired overlap 242.

The determination of whether undesired overlap 242 is present may be made by operator 206, navigation system 214, or some combination thereof. If undesired overlap 242 is present in planned routes 213, navigation system 214 may aid in providing better situation awareness to operator 206 as to what locations in number of locations 240 may be of concern or may need more attention.

Navigation system 214 is configured to identify set of planned routes 246 that are within predefined distance 248 of selected planned route 244 during a same point in time within viewing area 250 on map 228. Set of planned routes 246 may be several routes, one route, or no routes.

In these illustrative examples, a route in set of planned routes 246 that is within predefined distance 248 of selected planned route 244 is a coincident planned route to selected planned route 244.

In these illustrative examples, navigation system 214 may identify selected planned route 244 from user input generated by operator 206 through user interface 218. Viewing area 250 is an area on map 228. Viewing area 250 may be selected by operator 206, navigation system 214, or some combination thereof. Viewing area 250 may be along selected planned route 244 or along a projected course based on selected planned route 244.

In these illustrative examples, predefined distance 248 may be selected in a number of different ways. For example, predefined distance 248 may be a distance at which two or more of unmanned aerial vehicles 204 are closer to each other than desired. For example, unmanned aerial vehicles 204 may be closer to each other than desired when unmanned aerial vehicles 204 are unable to operate safely. In another example, unmanned aerial vehicles 204 may be closer to each other than desired when an overlap in images generated by unmanned aerial vehicles 204 occurs.

In these illustrative examples, the filtering of planned routes 213 to display set of planned routes 246 occurs in viewing area 250. This display of set of planned routes 246 with selected planned route 244 increases an emphasis of planned routes that may need more attention from operator 206. In other words, planned routes 213 are displayed without changes outside of viewing area 250. In these illustrative examples, viewing area 250 may be moved on map 228 by operator 206, navigation system 214, or a combination of the two.

Further, additional filtering may occur in viewing area 250 in some illustrative examples. For example, information not related to selected planned route 244 or set of planned routes 246 may not be displayed within viewing area 250. In this manner, emphasis on set of planned routes 246 and selected route 244 may occur by reducing other information displayed within viewing area 250.

With navigation system 214 identifying set of planned routes 246 and displaying set of planned routes 246 and selected planned route 244 in viewing area 250 without other planned routes 213, less time, concentration, and experience may be needed to use flight information 224 in display 226 as compared to other types of displays of flight information 224.

As a result, operator 206 may be able to more efficiently manage number of unmanned aerial vehicles 204. For example, operator 206 also may be able to manage greater numbers of unmanned aerial vehicles.

The illustration of aircraft environment 200 in FIG. 2 and the components in aircraft environment 200 in FIG. 2 are not meant to imply physical or architectural limitations to the manner in which different illustrative embodiments may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the illustrative embodiments may be applied to other types of aircraft other than unmanned aerial vehicles. For example, aircraft control system 210 may be located in an aircraft and operator 206 may be a pilot in the aircraft that manages the operation of the aircraft. In still other illustrative examples, operator 206 may be an air traffic controller and may manage the flight of multiple aircraft. The air traffic controller may send instructions to the pilot of the aircraft based on flight information 224 obtained from viewing area 250.

Although the illustrative examples have been described with respect to unmanned aerial vehicles, navigation system 214 may be used to display information for aircraft and other types of vehicles other than unmanned aerial vehicles. For example, an illustrative embodiment may be applied to other vehicles other than unmanned aerial vehicles, such as, without limitation, an aircraft, a submarine, a personnel carrier, an unmanned ground vehicle, a tank, a train, an automobile, a bus, a spacecraft, a surface ship, and other suitable vehicles.

Figure 3:
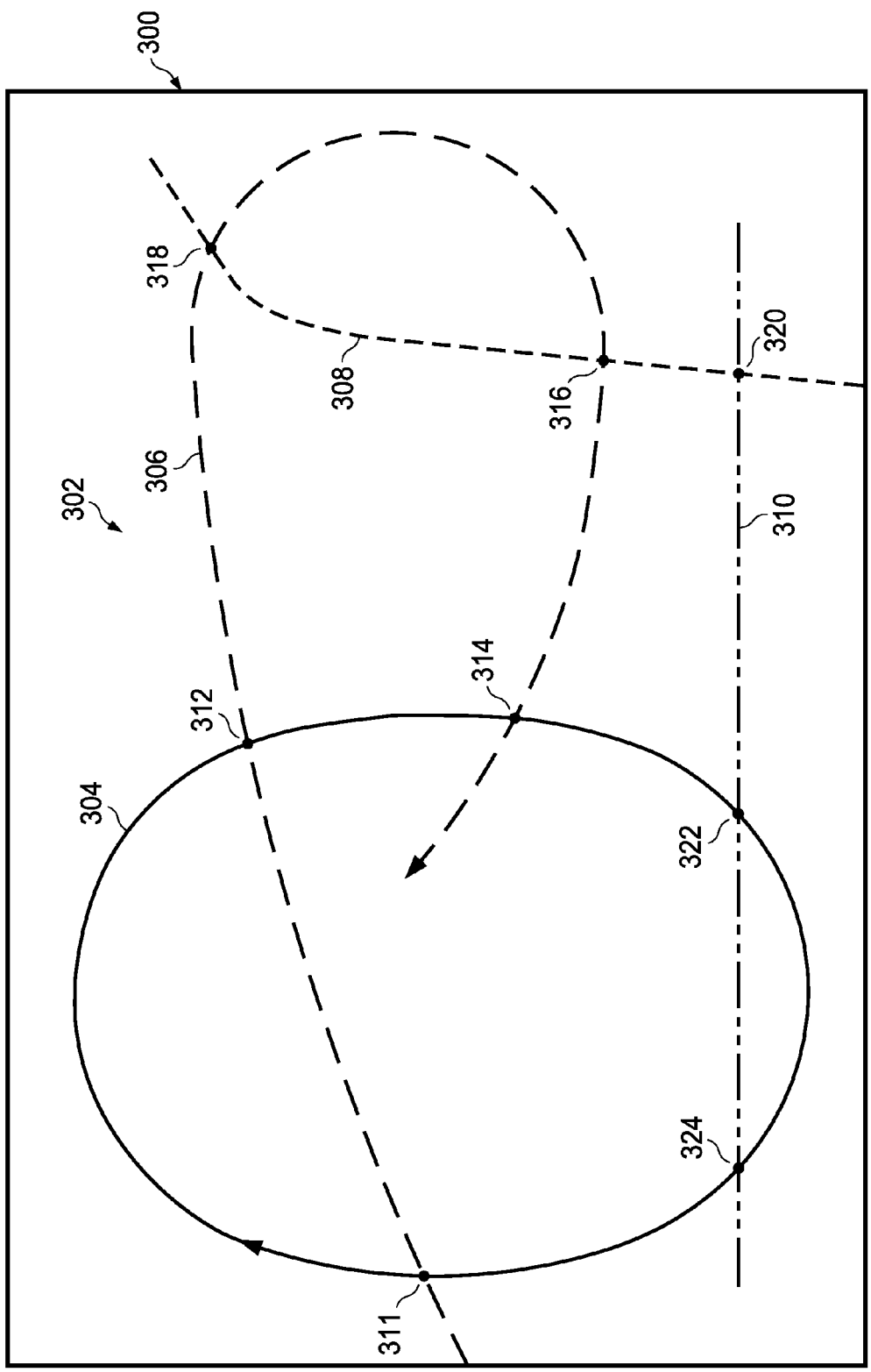
FIG. 3 is an illustration of a display of flight information in accordance with an illustrative embodiment.

Turning now to FIG. 3, an illustration of a display of flight information is depicted in accordance with an illustrative embodiment. In this illustrative example, display 300 is an example of an implementation for display 226 displayed on display system 220 in FIG. 2.

As depicted, map 302 is displayed in display 300. Map 302 takes the form of an aeronautical chart and shows terrain as well as other information.

Additionally, route 304, route 306, route 308, and route 310 are also displayed in these illustrative examples. These routes are routes for aircraft, such as unmanned aerial vehicles 102 in FIG. 1.

In this illustrative example, these routes overlap each other. The overlap of the routes is present at locations 311, 312, 314, 316, 318, 320, 322, and 324. Although the routes overlap each other in these locations, the unmanned aerial vehicles may not be within a predefined distance of each other that may be considered to be undesirable at these locations. For example, an unmanned aerial vehicle traveling along route 304 may reach location 312 several miles ahead of or behind an unmanned aerial vehicle traveling along route 306. This overlap may not be an undesirable overlap requiring additional attention from operator 206.

The overlap of these routes may be considered to be an undesirable overlap. The undesirable overlap may be present due to the number of locations in which the overlap occurs. For example, an operator may desire to obtain more information about overlaps between route 306 and route 308 at location 316 and between route 308 and route 310 at location 320.

Figure 4:
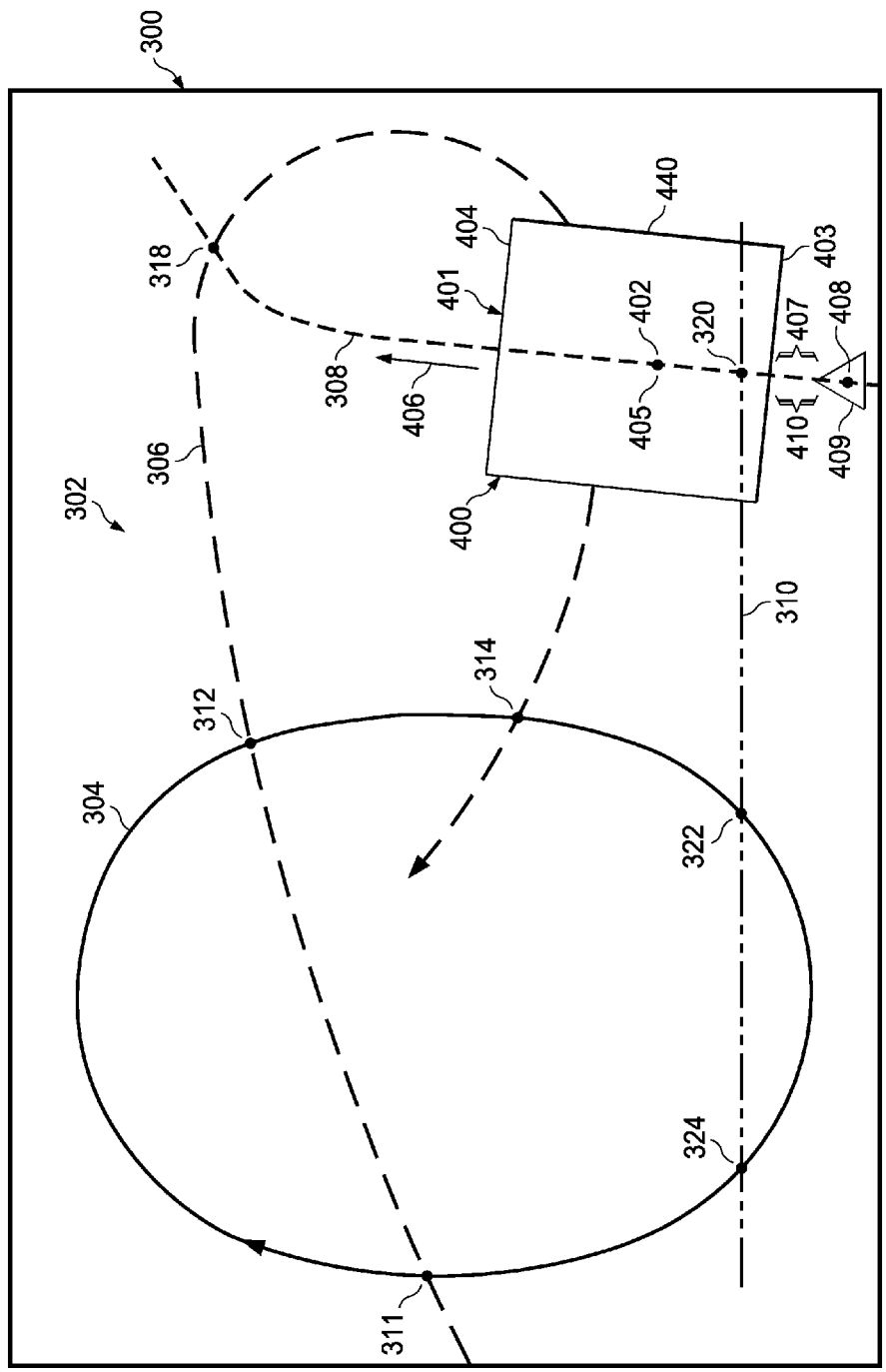
FIG. 4 is an illustration of a display of routes and a viewing area in accordance with an illustrative embodiment.

Turning now to FIG. 4, an illustration of a display of routes and a viewing area is depicted in accordance with an illustrative embodiment. In this depicted example, viewing area 400 is present in display 300. Viewing area 400 is an area on map 302 in this illustrative example. In this depicted example, viewing area 400 is graphically depicted by graphical indicator 440. Graphical indicator 440 takes the form of a line on map 302 that forms a regular quadrilateral 401 in the form of a square in this particular example.

As depicted, viewing area 400 shows route 308 and route 310 with location 320 as a location where these two routes overlap each other within a predefined distance. In contrast, route 306 is not shown within viewing area 400. In this illustrative example, route 306 is not show in viewing area 400 because the distance between the unmanned aerial vehicle for route 306 and the unmanned aerial vehicle for route 308 is not within a predefined distance that is considered to be undesirable for the two unmanned aerial vehicles.

In the areas outside of viewing area 400, the different routes on map 302 are displayed without changes. The change in display occurs within viewing area 400.

In other illustrative examples, other information also may be displayed on map 302. For example, information about airports, navigation aids, airspace restrictions, weather, and other suitable information may be displayed on map 302.

In this illustrative example, route 308 is the selected route of interest. As depicted, viewing area 400 is depicted by graphical indicator 440 in the form of regular quadrilateral 401 and has focal point 402. Focal point 402 may be spatial or based on time in these illustrative examples.

Focal point 402 may be the middle of viewing area 400 with respect to edge 403 and edge 404. In other illustrative examples, focal point 402 may be used as the center of viewing area 400. In other words, viewing area 400 may be positioned relative to route 308. For example, viewing area 400 may be positioned based on fixed location 405 selected on route 308. In another illustrative example, viewing area 400 may be maintained at a location based on a fixed point in time at which the location is reached by the unmanned aerial vehicle associated with route 308. In other words, viewing area 400 is maintained in a location corresponding to the unmanned aerial vehicle at a selected point in time.

In another illustrative example, viewing area 400 may be moved as the unmanned aerial vehicle associated with route 308 moves. For example, viewing area 400 may move in the direction of arrow 406. Viewing area 400 may move such that fixed distance 407 is maintained between viewing area 400 and current location 408 of the unmanned aerial vehicle. In other words, viewing area 400 may move on route 308 to maintain fixed distance 407 ahead of current location 408. In this illustrative example, graphical indicator 409 identifies current location 408 of the unmanned aerial vehicle.

In yet another illustrative example, viewing area 400 also may move in the direction of arrow 406 on route 308 such that selected distance 410 is present between current location 408 of an unmanned aerial vehicle associated with route 308 and viewing area 400. In this illustrative example, selected distance 410 is based on a fixed amount of time ahead of a current time. In other words, selected distance 410 may change depending on changes in the operation of the unmanned aerial vehicle associated with route 308. For example, if the unmanned aerial vehicle increases in speed, selected distance 410 may become longer. If the unmanned aerial vehicle decreases in speed, selected distance 410 may become shorter.

Figure 5:
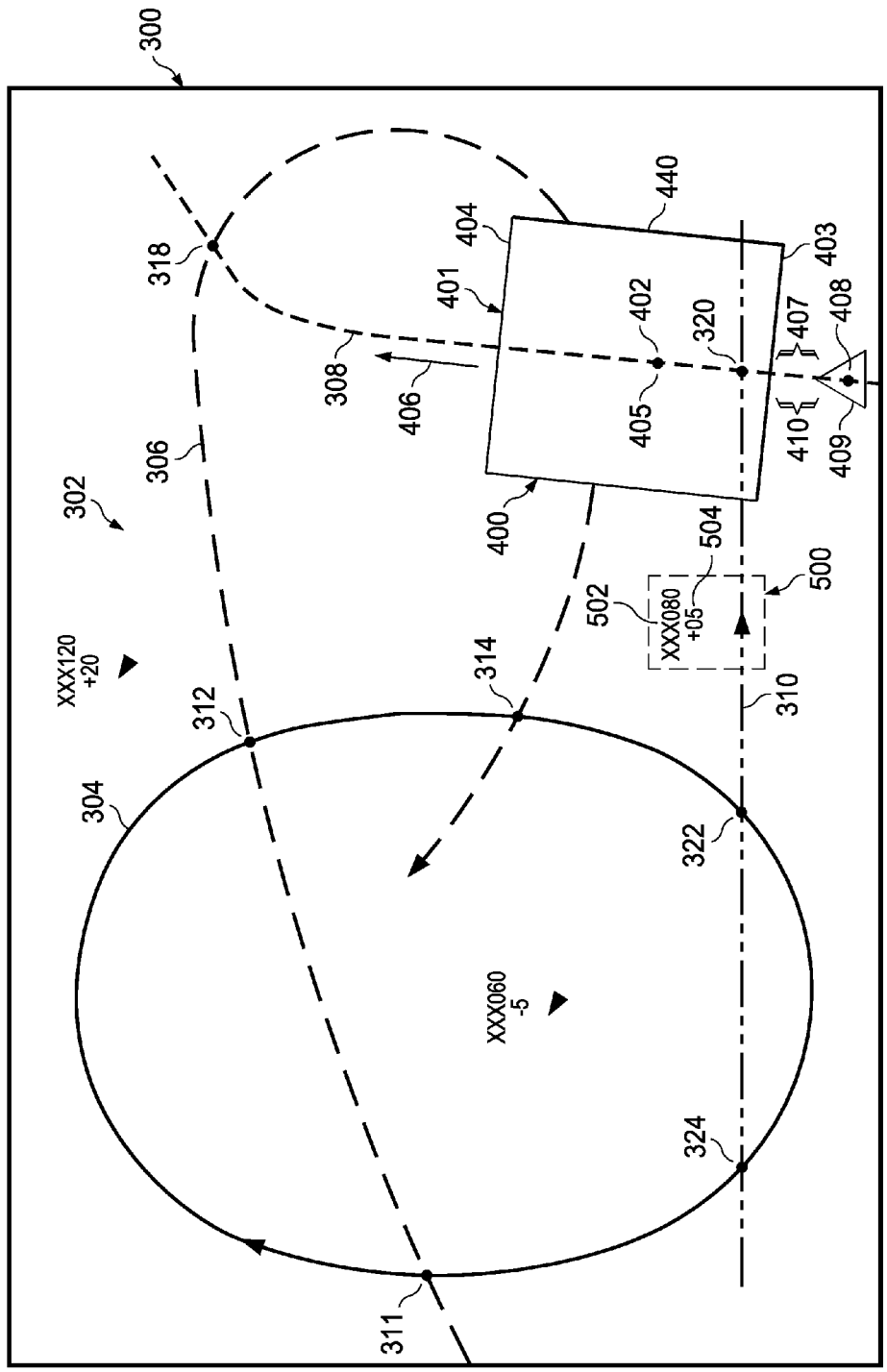
FIG. 5 is another illustration of a display of routes in a viewing area in accordance with an illustrative embodiment.

With reference now to FIG. 5, another illustration of a display of routes in a viewing area is depicted in accordance with an illustrative embodiment. In this depicted example, additional information 500 is also displayed within display 300. Additional information 500 is other information that may be useful in managing the operation of the unmanned aerial vehicles for route 308 and route 310. In this manner, less clutter may be present in other portions of map 302 outside of viewing area 400.

In this illustrative example, additional information 500 includes graphical indicator 502 and graphical indicator 504. Graphical indicator 502 represents an aircraft identifier for the aircraft traveling along route 310 in the direction of intersection with route 308. Graphical indicator 504 represents the vertical separation of graphical indicator 502 along route 310 and the aircraft traveling along route 308. In other words, information in additional information 500 provides information about other aircraft and the vertical separation between the other aircraft and the aircraft traveling along route 308. Of course, other information other than aircraft identifier and vertical separation may be depicted in additional information 500. In other illustrative examples, information for more than one aircraft may be displayed in display 300.

Further, the aircraft highlighted in additional information 500 is an aircraft that is relevant to the flight path of an aircraft on route 308. Additional information 500 highlights this aircraft as a potential conflict. Other aircraft may be depicted in display 300, but may not be highlighted because there is no potential conflict between these aircraft and the aircraft traveling on route 308.

Figure 6:
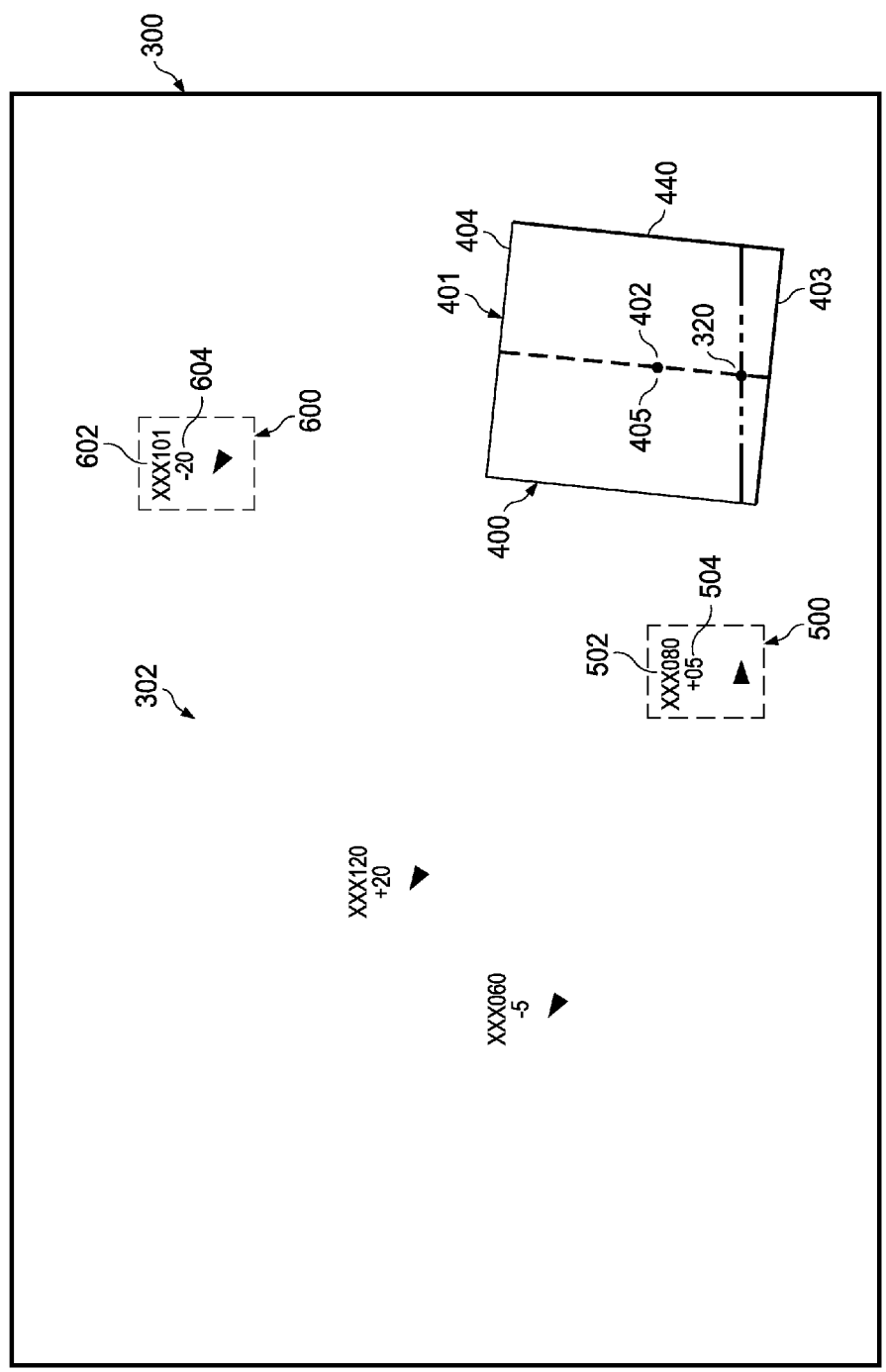
FIG. 6 is another illustration of a display of routes in a viewing area in accordance with an illustrative embodiment.

With reference now to FIG. 6, another illustration of a display of routes in a viewing area is depicted in accordance with an illustrative embodiment. In this illustrative example, display 300 is filtered to display only viewing area 400, additional information 500, and additional information 600. Additional information 600 includes graphical indicator 602 and graphical indicator 604. Graphical indicator 602 is an aircraft identifier and graphical indicator 604 is a vertical separation in these illustrative examples. Other aircraft may be depicted in display 300. These aircraft are not currently in conflict with the aircraft traveling along route 308. These aircraft are not highlighted by additional information indicators. In other words, only the aircraft that have a potential conflict with the aircraft traveling along route 308 are highlighted.

The illustration of display 300 in FIGS. 3-6 is not meant to limit the manner in which display 226 in FIG. 2 may be displayed on display system 220. For example, other numbers of planned routes may be displayed on display 300. For example, a single planned route, three planned routes, eight planned routes, or some other number of planned routes may be displayed on display 300.

In another illustrative example, additional graphical indicators may be present for unmanned aerial vehicles associated with route 304, route 306, route 308, and route 310 in addition to graphical indicator 409 displayed at current location 408 for the unmanned aerial vehicle associated with route 308.

In still other illustrative examples, one or more viewing areas in addition to viewing area 400 also may be present on display 300. Further, viewing area 400 may be adjustable in at least one of size and geometry. For example, viewing area 400 may be selected such that viewing area 400 displays more of route 308. In other examples, viewing area 400 may be selected to display less of route 308.

Additionally, viewing area 400 may take other shapes other than a square as depicted in display 300. For example, viewing area 400 may have a shape selected from one of a regular quadrilateral, a square, a triangle, a rectangle, a circle, a hexagon, or some other suitable shape.

Figure 7:
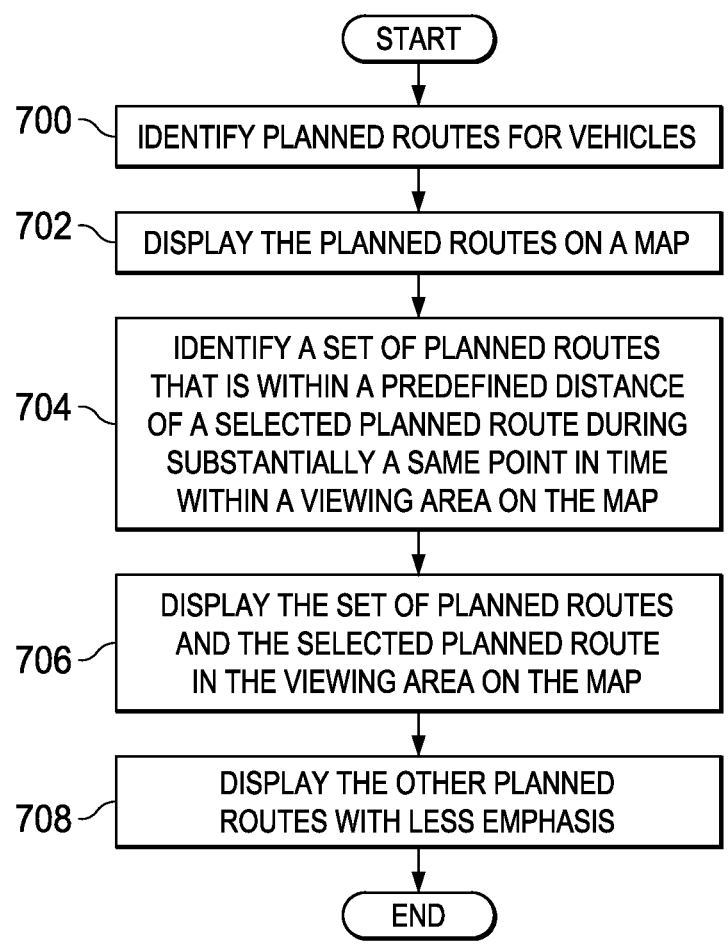
FIG. 7 is an illustration of a flowchart of a process for assisting in the management of vehicles in accordance with an illustrative embodiment.

With reference now to FIG. 7, an illustration of a flowchart of a process for assisting in the management of vehicles is depicted in accordance with an illustrative embodiment. The process illustrated in FIG. 7 may be implemented in navigation system 214 in FIG. 2.

The process begins by identifying planned routes for vehicles (operation 700). These vehicles may be vehicles of the same type or different types. For example, the vehicles may be manned aircraft, unmanned aerial vehicles, or some combination thereof. In still other illustrative examples, the vehicles may be surface ships, submarines, or a combination thereof.

The process displays the planned routes on a map (operation 702). The map may be, for example, map 228 in FIG. 2 displayed on display system 220. The process then identifies a set of planned routes that is within a predefined distance of a selected planned route during substantially a same point in time within a viewing area on the map (operation 704). In operation 704, the process identifies when routes in the set of planned routes overlap not only spatially, but also temporally. In other words, overlaps of interest are identified as ones in which the planned routes overlap at a location at the same point in time or substantially the same point in time.

The set of planned routes and the selected planned route are displayed in the viewing area on the map (operation 706). Other planned routes are displayed with less emphasis (operation 708) with the process terminating thereafter. In operation 708, the other planned routes are routes other than the set of planned routes and the selected planned route.

In the illustrative examples, the reduction in emphasis may be that the routes are not displayed, or less information about these routes is displayed. In some examples, no routes other than the selected planned route of the vehicle may be displayed. The reduction in emphasis of the other planned routes may occur by increasing the emphasis of the set of planned routes and the selected planned route. For example, a graphical indicator may be displayed in the locations of overlap between the set of planned routes and the selected planned route within the viewing area. The graphical indicators may draw more attention to locations that an operator may need to see more closely as compared to other locations where the overlap occurs.

Figure 8A:
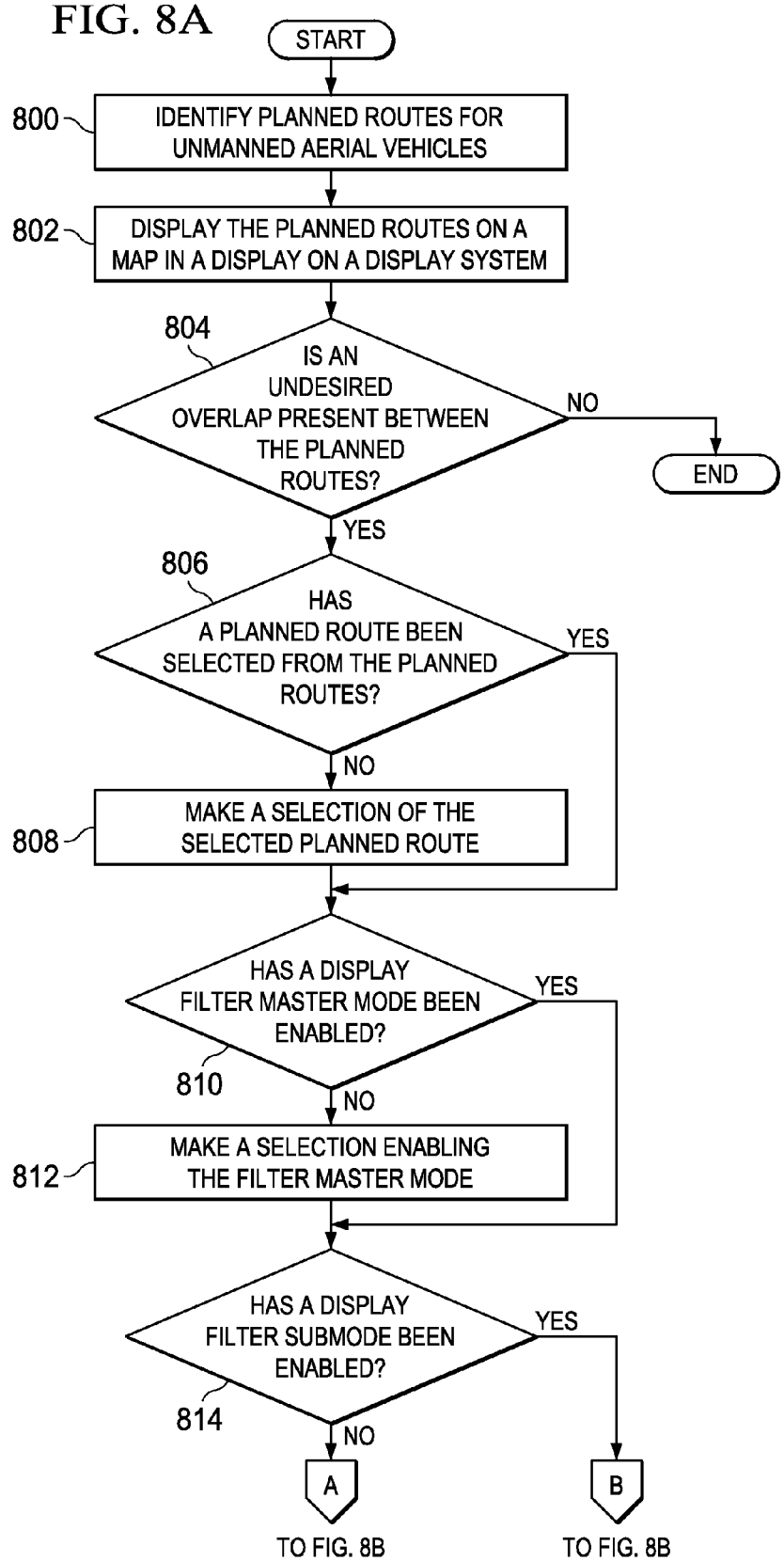
FIGS. 8A and 8B are illustrations of a flowchart of a process for assisting in the management of unmanned aerial vehicles in accordance with an illustrative embodiment.
Figure 8B:
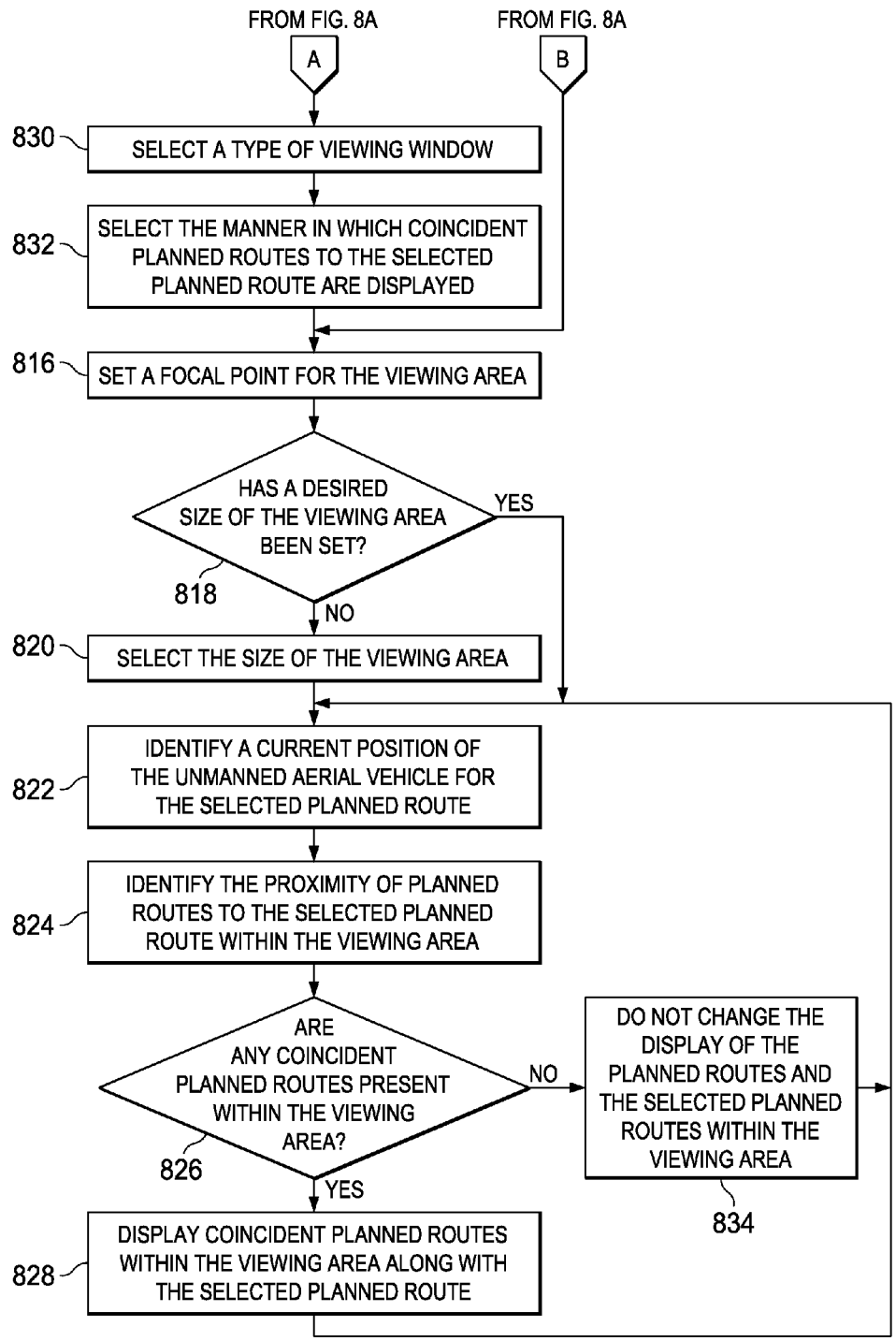

Turning now to FIGS. 8A and 8B, an illustration of a flowchart of a process for assisting in the management of unmanned aerial vehicles is depicted in accordance with an illustrative embodiment. In this illustrative example, the process illustrated in FIGS. 8A and 8B may be implemented in navigation system 214 in FIG. 2.

The process begins by identifying planned routes for unmanned aerial vehicles (operation 800). These planned routes may include a clearance, a flight plan, a deviation from the flight plan, or any projected route in response to a change in parameters in the flight of the aircraft. The process displays the planned routes on a map in a display on a display system (operation 802). A determination is made as to whether an undesired overlap is present between the planned routes (operation 804). The determination in operation 804 may be made through user input from an operator of the unmanned aerial vehicles, navigation system 214, or a combination of the two.

If the undesired overlap is present between the planned routes, the process determines whether a planned route has been selected from the planned routes (operation 806). If a planned route has not been selected, a selection of a selected planned route is made (operation 808). In this illustrative example, the selection may be made from input, such as user input received from an operator. Alternatively, navigation system 214 may make the selection without user input.

A determination is made as to whether a display filter master mode has been enabled (operation 810). In this illustrative example, the display filter master mode in operation 810 is the mode in which a viewing area is generated to identify routes in which locations of overlap are within a predefined distance between the unmanned aerial vehicles within a viewing area. If the display filter master mode has not been enabled, a selection enabling the display filter master mode is made (operation 812).

A determination is made as to whether a display filter submode has been enabled (operation 814). The display filter submode may indicate the manner in which information is to be displayed in the viewing area and the manner in which the viewing area moves or does not move.

If the filter submode has been enabled, the process sets a focal point for the viewing area (operation 816). In this illustrative example, the focal point is the time around which the viewing area is generated in these illustrative examples. The focal point is the center or middle of the viewing area.

The process then determines whether a desired size of the viewing area has been set (operation 818). The size of the viewing area may be identified in a number of different ways. For example, the size may be based on time, distance, or some other suitable measurement. For example, the window may be five minutes, twenty minutes, one hour, three hours, or some other suitable time frame. In another illustrative example, the size of the viewing area may be, for example, 1,000 feet, one mile, ten miles, or some other suitable measurement. The selection of the size of the window may depend on the speed of the vehicle. If a desired size has not been set, a selection of the size is made (operation 820). This selection selects a size of the window.

A current position of the unmanned aerial vehicle for the selected planned route is identified (operation 822). The process then identifies the proximity of planned routes to the selected planned route within the viewing area (operation 824). In other words, a determination is made as to whether any of the planned routes are within a predefined distance of the selected planned route during a same point in time for the planned routes within the viewing area on the map. If a planned route is within a predefined distance of the selected planned route within a point of time within the viewing area, that route is a coincident planned route to the selected planned route.

A determination is then made as to whether any coincident planned routes are present within the viewing area (operation 826). If coincident planned routes are present within the viewing area, those coincident planned routes are displayed within the viewing area along with the selected planned route (operation 828). The process then returns to operation 822.

If none of the planned routes are within the predefined distance of the selected planned route at a same time within the viewing area in operation 826, the process returns to operation 822 without displaying any additional routes other than the selected planned route.

With reference again to operation 814, if the display filter submode has not been enabled, a selection of a type of viewing window is made (operation 830). In these illustrative examples, the type of viewing window may include a viewing window with a fixed temporal location on the selected planned route, a fixed location on the map on the selected planned route, a viewing window that has a moving temporal location on the selected planned route, and a viewing window that has a moving spatial location on the selected planned route.

A viewing area with a fixed temporal location on the selected planned route is a location on the selected planned route corresponding to a point in time. The focal point of the viewing area is placed on the location corresponding to the point in time in this illustrative example. A viewing area with a fixed location is a viewing area having a focal point on the fixed location on the selected planned route. This fixed location may be any location on the selected planned route without respect to time.

A viewing area with a temporal location that moves on the selected planned route is a viewing area that moves on the selected planned route by a distance ahead of a current location of the unmanned aerial vehicle associated with the selected planned route in which the selected distance is based on a fixed amount of time ahead of the current time. In other words, the selected distance is the distance that the unmanned aerial vehicle moves during the fixed amount of time.

As a result, if the unmanned aerial vehicle decreases its speed, the selected distance becomes smaller. If the unmanned aerial vehicle increases its speed, the selected distance becomes longer.

A viewing area that moves on a spatial location on the selected planned route is a viewing area that moves some fixed distance ahead of the current location of the unmanned aerial vehicle in these illustrative examples. Of course, other types of viewing areas may be used depending on the particular implementation. For example, viewing areas may be selected with fixed locations that are not on selected planned route.

The process also selects the manner in which coincident planned routes to the selected planned route are displayed (operation 832) with the process proceeding to operation 816 thereafter. For example, only coincident planned routes may be displayed while other planned routes are not displayed within the viewing area. In other words, only those portions of routes that are within the viewing area are displayed when then routes are in conflict or are potentially in conflict. In other illustrative examples, more details about the coincident planned routes may be provided inside or outside of the viewing area. The number of details provided by the display in the viewing area may be selected by an operator of the unmanned aerial vehicle.

With reference again to operation 826, if coincident planned routes are not present within the viewing area, the process does not change the display of the planned routes and the selected planned routes within the viewing area (operation 834), with the process then returning to operation 822.

Turning back to operation 818, if a desired duration for the viewing area has been set, the process proceeds to operation 822 as described above. With reference again to operation 810, if a display filter master mode has been enabled, the process proceeds to operation 814 as described above.

With reference back to operation 806, if a planned route has been selected, the process proceeds to operation 810. Turning back to operation 804, if an undesired overlap is not present, the process terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, although the different operations in FIG. 8 have been described with respect to unmanned aerial vehicles, these operations may be applied to other types of vehicles. For example, the different operations may be applied to manned aerial vehicles, unmanned ground vehicles, ships, trucks, trains, and other suitable types of vehicles.

Figure 9:
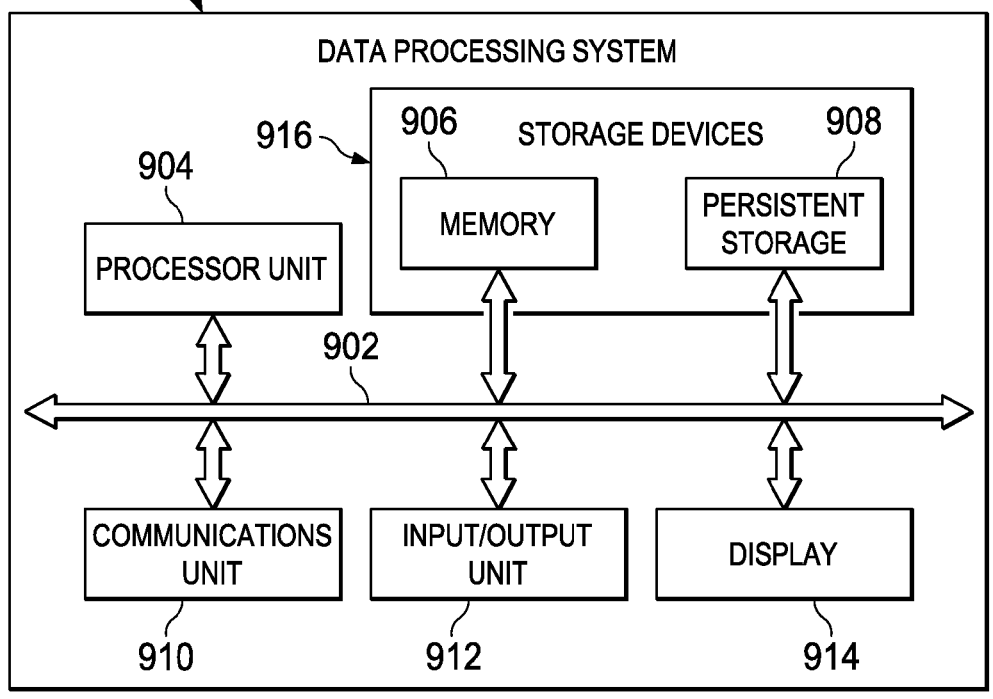
FIG. 9 is an illustration of a data processing system in accordance with an illustrative embodiment.
Figure 9:
Figure 9:
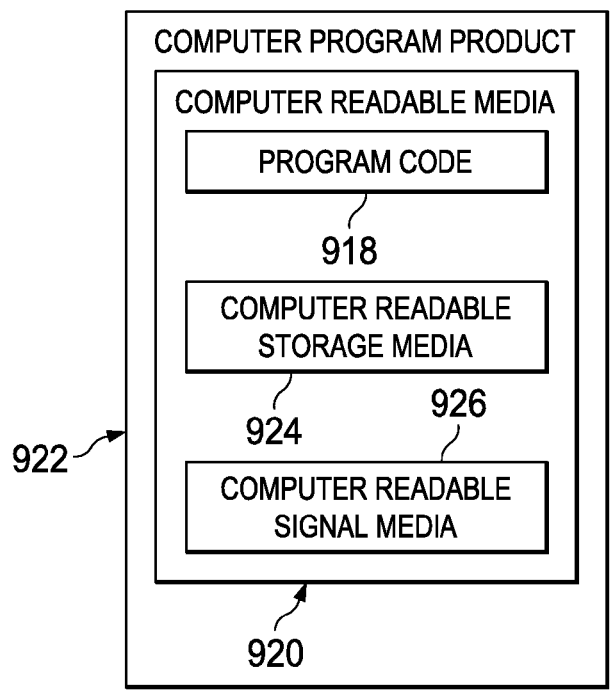

Turning now to FIG. 9, an illustration of a data processing system is depicted in accordance with an illustrative embodiment. Data processing system 900 may be used to implement computer system 216 in FIG. 2. In this illustrative example, data processing system 900 includes communications framework 902, which provides communications between processor unit 904, memory 906, persistent storage 908, communications unit 910, input/output (I/O) unit 912, and display 914. In this example, communication framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Thus, the illustrative embodiments provide a method and apparatus for assisting an operator in managing vehicles. In the illustrative examples, an operator may manage multiple unmanned aerial vehicles using navigation system 214. For example, a set of planned routes within a predefined distance of a selected planned route during a same point in time may be identified. These routes may be displayed in a viewing area with an emphasis that allows the operator to update one or more planned routes.

With one or more illustrative embodiments, an identification of situations in which re-routing of unmanned aerial vehicles may be more easily identified. As a result, an operator may control more unmanned aerial vehicles or manage unmanned aerial vehicles for longer periods of time.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for assisting in management of unmanned aerial vehicles, the method comprising:
    identifying planned routes for the unmanned aerial vehicles;
    displaying the planned routes on a map; and
    identifying a set of planned routes that is within a predefined distance of a selected planned route during substantially a same point in time within a viewing area on the map.

2. The method of claim 1 further comprising:
    displaying the set of planned routes and the selected planned route in the viewing area on a display system.

3. The method of claim 1 further comprising:
    maintaining the viewing area in a fixed location.

4. The method of claim 1 further comprising:
    maintaining the viewing area in a location on the selected planned route corresponding to a fixed point in time.

5. The method of claim 1 further comprising:
    moving the viewing area on the selected planned route to maintain a fixed distance ahead of a current location of an unmanned aerial vehicle associated with the selected planned route.

6. The method of claim 1 further comprising:
    moving the viewing area on the selected planned route by a selected distance ahead of a current location of an unmanned aerial vehicle associated with the selected planned route, wherein the selected distance is based on a fixed amount of time ahead of a current time.

7. The method of claim 1 further comprising:
    displaying other planned routes outside of the set of planned routes with less emphasis.

8. The method of claim 1 further comprising:
    changing at least one of the planned routes in the set of planned routes based on the set of planned routes identified.

9. The method of claim 1, wherein the viewing area is adjustable in at least one of size and geometry.

10. An apparatus comprising:
    a navigation system configured to identify planned routes for unmanned aerial vehicles; display the planned routes on a map; and identify a set of planned routes that is within a predefined distance of a selected planned route during substantially a same point in time within a viewing area on the map.

11. The apparatus of claim 10, wherein the navigation system is further configured to display the set of planned routes and the selected planned route in the viewing area.

12. The apparatus of claim 10, wherein the navigation system is further configured to maintain the viewing area in a fixed location.

13. The apparatus of claim 10, wherein the navigation system is further configured to maintain the viewing area in a location corresponding to an unmanned aerial vehicle at a selected point in time.

14. The apparatus of claim 10, wherein the navigation system is further configured to move the viewing area on the selected planned route to maintain a fixed distance ahead of a current location of an unmanned aerial vehicle associated with the selected planned route.

15. The apparatus of claim 10, wherein the navigation system is further configured to move the viewing area on the selected planned route by a selected distance ahead of a current location of an unmanned aerial vehicle associated with the selected planned route, wherein the selected distance is based on a fixed amount of time ahead of a current time.

16. A method for assisting in management of vehicles, the method comprising:
    identifying planned routes for the vehicles;
    displaying the planned routes on a map; and
    identifying a set of planned routes that is within a predefined distance of a selected planned route during substantially a same point in time within a viewing area on the map.

17. The method of claim 16 further comprising:
    maintaining the viewing area in a fixed location.

18. The method of claim 16 further comprising:
    maintaining the viewing area in a location on the selected planned route corresponding to a fixed point in time.

19. The method of claim 16 further comprising:
    moving the viewing area on the selected planned route to maintain a fixed distance ahead of a current location of a vehicle associated with the selected planned route.

20. The method of claim 16 further comprising:
    moving the viewing area on the selected planned route by a selected distance ahead of a current location of a vehicle associated with the selected planned route, wherein the selected distance is based on a fixed amount of time ahead of a current time.

* * * * *